(12) United States Patent
Yu et al.

(10) Patent No.: US 8,736,484 B2
(45) Date of Patent: May 27, 2014

(54) ENHANCED-RESOLUTION PHASED ARRAY RADAR

(75) Inventors: Kai-Bor Yu, Niskayuna, NY (US); Manuel F. Fernandez, Cazenovia, NY (US); Svetlana M. Bachmann, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 551 days.

(21) Appl. No.: 12/854,473

(22) Filed: Aug. 11, 2010

(65) Prior Publication Data

US 2012/0038504 A1    Feb. 16, 2012

(51) Int. Cl.
*G01S 13/00* (2006.01)

(52) U.S. Cl.
USPC ............... 342/81; 342/26 R; 342/74; 342/195

(58) Field of Classification Search
USPC .......... 342/13–19, 81, 195, 26 R, 26 A, 26 B, 342/26 C, 26 D, 70–74, 146–158
See application file for complete search history.

(56) References Cited

U.S. PATENT DOCUMENTS

| | | | | |
|---|---|---|---|---|
| 3,761,936 A | * | 9/1973 | Archer et al. ................ | 343/754 |
| 3,787,841 A | * | 1/1974 | Buehler et al. ............... | 342/33 |
| 3,803,625 A | * | 4/1974 | Nemit ........................... | 342/368 |
| 4,107,692 A | * | 8/1978 | Hutcheon et al. ............ | 342/434 |
| 4,243,988 A | * | 1/1981 | Kang et al. ................... | 342/158 |
| 4,246,580 A | * | 1/1981 | Caputi, Jr. .................... | 342/25 F |
| 4,431,995 A | * | 2/1984 | Barton et al. ................. | 342/373 |
| 4,608,566 A | * | 8/1986 | Ennis et al. ................... | 342/28 |
| 4,649,388 A | * | 3/1987 | Atlas ............................. | 342/26 D |
| 4,716,414 A | * | 12/1987 | Luttrell et al. ................ | 342/179 |
| 4,792,805 A | * | 12/1988 | Miglia .......................... | 342/372 |
| 4,802,096 A | * | 1/1989 | Hainsworth et al. ......... | 701/301 |
| RE33,152 E | * | 1/1990 | Atlas ............................. | 342/26 R |
| 5,045,856 A | * | 9/1991 | Paoletti ......................... | 342/70 |
| 5,218,360 A | * | 6/1993 | Goetz et al. .................. | 342/407 |
| 5,469,168 A | * | 11/1995 | Anderson ..................... | 342/26 D |
| 5,539,409 A | * | 7/1996 | Mathews et al. ............. | 342/26 B |
| 5,579,010 A | * | 11/1996 | Iihoshi et al. ................. | 342/70 |
| 5,686,922 A | * | 11/1997 | Stankwitz et al. ............ | 342/196 |
| 5,781,157 A | * | 7/1998 | Laird ............................. | 342/379 |
| 6,043,772 A | * | 3/2000 | Voigtlaender et al. ....... | 342/70 |
| 6,061,001 A | * | 5/2000 | Sugimoto ..................... | 340/903 |
| 6,081,221 A | * | 6/2000 | Zrnic et al. ................... | 342/26 R |
| 6,087,974 A | * | 7/2000 | Yu .................................. | 342/62 |
| 6,127,963 A | * | 10/2000 | Schneemann ................. | 342/70 |
| 6,133,887 A | * | 10/2000 | Tanizaki et al. .............. | 343/754 |

(Continued)

OTHER PUBLICATIONS

Cheong, B.L., et al., "A Time Series Weather Radar Simulator Based on High-Resolution Atmospheric Models", Journal of Atmospheric and Oceanic Technology, vol. 25, pp. 230-243, Feb. 2008.

*Primary Examiner* — Peter Bythrow
(74) *Attorney, Agent, or Firm* — Howard IP Law Group, PC

(57) ABSTRACT

A system and method for increasing the effective angular resolution of a multi-function phased array radar system is provided. The system is operative to simultaneously transmit a plurality of overlapping sub-beams covering a representative central beam. A de-convolution process is applied to received return signals. The process includes determining the reflectivity within sub-beamwidth resolution cells defined by the overlapping sub-beams. Generated sub-beamwidth data provides the radar system with an effective angular resolution beyond that of any single transmitted beam.

12 Claims, 2 Drawing Sheets

(56) References Cited

U.S. PATENT DOCUMENTS

| | | | | |
|---|---|---|---|---|
| 6,137,434 A * | 10/2000 | Tohya et al. | | 342/70 |
| 6,335,700 B1 * | 1/2002 | Ashihara | | 342/70 |
| 6,380,884 B1 * | 4/2002 | Satou et al. | | 342/70 |
| 6,414,628 B1 * | 7/2002 | Ashihara | | 342/173 |
| 6,498,581 B1 * | 12/2002 | Yu | | 342/90 |
| 6,559,797 B1 * | 5/2003 | Chang | | 342/368 |
| 6,567,034 B1 * | 5/2003 | Yu | | 342/16 |
| 6,653,973 B2 * | 11/2003 | Yu | | 342/90 |
| 6,661,366 B2 * | 12/2003 | Yu | | 342/17 |
| 6,661,376 B2 * | 12/2003 | Maceo et al. | | 342/373 |
| 6,667,710 B2 * | 12/2003 | Cornell et al. | | 342/26 R |
| 6,667,712 B2 * | 12/2003 | Ericson et al. | | 342/354 |
| 6,697,009 B2 * | 2/2004 | Yu | | 342/17 |
| 6,762,711 B1 * | 7/2004 | Doerfler | | 342/70 |
| 7,109,912 B1 * | 9/2006 | Paramore et al. | | 342/26 B |
| 7,132,976 B2 * | 11/2006 | Shinoda et al. | | 342/70 |
| 7,180,447 B1 * | 2/2007 | Jacomb-Hood | | 342/374 |
| 7,245,250 B1 * | 7/2007 | Kalayeh | | 342/25 R |
| 7,265,713 B2 * | 9/2007 | Lewis | | 342/372 |
| 7,268,722 B2 * | 9/2007 | Gottwald et al. | | 342/70 |
| 7,362,257 B2 * | 4/2008 | Bruzzone et al. | | 342/13 |
| 7,423,578 B1 * | 9/2008 | Tietjen | | 342/59 |
| 7,450,068 B2 * | 11/2008 | Chen et al. | | 342/427 |
| 7,474,262 B2 * | 1/2009 | Alland | | 342/371 |
| 7,477,921 B2 * | 1/2009 | Shattil | | 455/562.1 |
| 7,671,789 B1 * | 3/2010 | Yu | | 342/152 |
| 7,737,879 B2 * | 6/2010 | Tietjen et al. | | 342/59 |
| 7,859,451 B2 * | 12/2010 | Yu et al. | | 342/149 |
| 8,264,399 B2 * | 9/2012 | Shinomiya et al. | | 342/74 |
| 8,466,829 B1 * | 6/2013 | Volman et al. | | 342/147 |
| 2002/0140597 A1 * | 10/2002 | Taylor et al. | | 342/28 |
| 2003/0001770 A1 * | 1/2003 | Cornell et al. | | 342/26 |
| 2003/0020646 A1 * | 1/2003 | Yu | | 342/17 |
| 2003/0058153 A1 * | 3/2003 | Yu | | 342/17 |
| 2003/0085832 A1 * | 5/2003 | Yu | | 342/16 |
| 2003/0085833 A1 * | 5/2003 | Yu | | 342/17 |
| 2003/0095067 A1 * | 5/2003 | Howell | | 342/377 |
| 2003/0132874 A1 * | 7/2003 | Krikorian et al. | | 342/25 |
| 2005/0018540 A1 * | 1/2005 | Gilbert et al. | | 367/138 |
| 2005/0046612 A1 * | 3/2005 | Blunt et al. | | 342/195 |
| 2005/0110673 A1 * | 5/2005 | Izumi et al. | | 342/70 |
| 2005/0179587 A1 * | 8/2005 | Mosher et al. | | 342/147 |
| 2006/0164294 A1 * | 7/2006 | Gottwald et al. | | 342/70 |
| 2006/0181451 A1 * | 8/2006 | Samson, Jr. | | 342/160 |
| 2007/0001897 A1 * | 1/2007 | Alland | | 342/70 |
| 2009/0267822 A1 * | 10/2009 | Shinoda et al. | | 342/70 |
| 2010/0109951 A1 * | 5/2010 | Taenzer | | 342/442 |
| 2010/0271254 A1 * | 10/2010 | Kanamoto et al. | | 342/27 |

* cited by examiner

ENHANCED-RESOLUTION PHASED ARRAY RADAR

FIELD OF THE INVENTION

The present invention relates to radar systems, specifically to high-resolution, multi-function phased array radar systems.

BACKGROUND

Radar systems are vital to the operations of various agencies such as the National Oceanic and Atmospheric Administration (NOAA), National Weather Service (NWS), the Federal Aviation Administration (FAA), the Department of Defense (DOD) and the Department of Homeland Security (DHS). These agencies have multiple requirements for modern radar technology covering a wide range of operational purposes including weather observation, meteorological research, aircraft tracking, unmanned aircraft systems surveillance and surface transportation.

As each of these agencies requires a radar system with unique capabilities, the current radar infrastructure comprises a wide variety of radar types and configurations. For example, weather tracking operations by the NOAA and FAA may require a system capable of dual-polarization operation. However, radar tasks associated with the DHS and/or other FAA operations do not have such requirements. Likewise, a narrow beamwidth, for example, no greater than one (1) degree, may be required for certain tracking operations but not for others. These parameters may necessitate variations in antenna array size, radiating element type, cost, and/or complexity.

As many existing radar systems are coming due for replacement, government and industry are working to transition from these individualized systems to a universal system capable of meeting the various agency demands, while offering reduced complexity and substantial cost savings. One proposed solution is digital phased array technology, specifically multi-function phased array radar (MPAR). A phased array antenna is comprised of numerous radiating elements each having a phase shifter. Beams are formed by selectively activating all or a portion of antenna elements of a given array. The beam pattern of these antennas can be controlled to produce one or more directed beams, which may be broad or narrow ("pencil" type). Scanning or steering of the beams is accomplished by shifting the phase of the signals emitted from the elements in order to provide constructive and/or destructive interference. The ability to form and steer a radar beam permits multiple functions to be performed by the same radar system. In addition to multi-function operation, these arrays have a quicker response time and operate at a higher resolution than existing rotating radar systems.

While MPAR offers advantages over current arrangements, several technical and economic obstacles need to be overcome before it can be implemented successfully as a universal system. One such example of an application creating technical challenges is the above-described weather-related radar systems.

For example, a current requirement for the next-generation weather system is to provide one (1) degree of angular resolution. However, it has been shown that some meteorological signatures, such as mesocyclone and tornado vortex signatures, can be detected at greater ranges using radar data with finer resolution, more particularly, an angular resolution of one-half (0.5) of one degree. Radar data produced at this angular resolution is termed "super-resolution" data. As this enhanced resolution increases the range at which small tornado parent circulation patterns can be detected, weather tracking systems using super-resolution data may provide more advanced warnings. Super-resolution data also provides additional detail to aid in other severe storm analysis and weather-related risks, such as predicting flash floods.

Current solutions capable of achieving super-resolution data may utilize over-sized antenna arrays in order to generate a very narrow beam width, and thus a higher angular resolution. However, this increased antenna array size is impractical for use in a universal application and is not cost effective. Other solutions include the use of exceedingly costly antenna elements having improved angular resolution. These elements are cost-prohibitive for use in a universal system.

Accordingly, alternate methods of achieving sufficiently narrow angular resolution, in particular super-resolution, in an MBAR system are desired.

SUMMARY

In one embodiment of the present invention, an MPAR system is provided. The system comprises an antenna array for providing a central beam, and simultaneously transmitting a plurality of overlapping sub-beams covering the central beam. A de-convolution module is provided to process the received return signals from each of the sub-beams. The module is responsive to both the received return signals, as well as a matrix indicative of the antenna pattern to output sub-beam data comprising return information for the overlapping portions of the transmitted beams. This sub-beam data provides the radar system with an effective angular resolution beyond that of any single transmitted beam.

In another embodiment of the present invention, a method of operating an MPAR system is provided. The method includes transmitting a central beam and a plurality of overlapping sub-beams covering the central beam. Reflected return signals from the overlapping sub-beams are received and processed using a de-convolution operation. The de-convolution operation includes applying a weighted matrix representative of the antenna pattern in order to generated high-resolution sub-beam data.

DETAILED DESCRIPTION OF PREFERRED EMBODIMENTS

Figure 1:
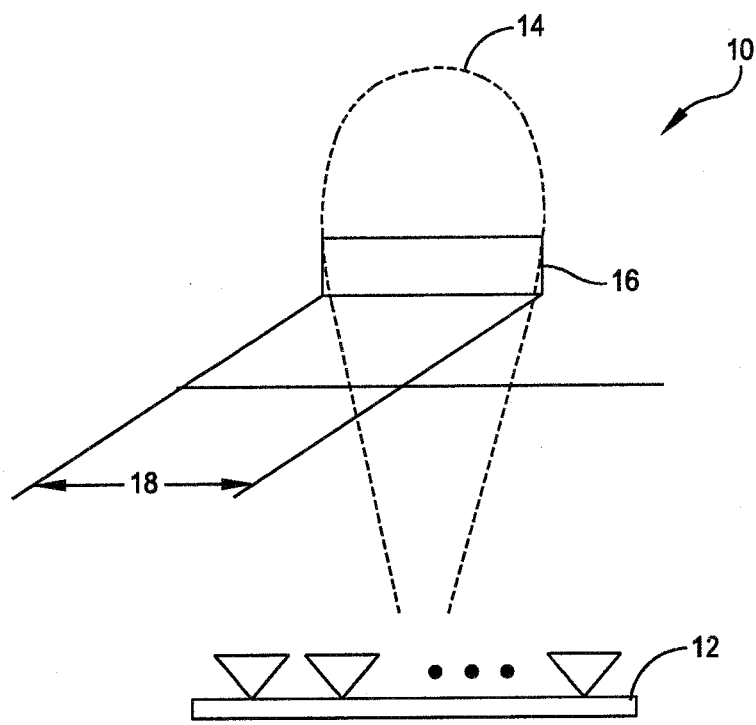
FIG. 1 is a graphical representation of a traditional radar system producing a radar beam having an exemplary resolution defined by a resolution cell.

It is to be understood that the figures and descriptions of the present invention have been simplified to illustrate elements that are relevant for a clear understanding of the present invention, while eliminating, for purposes of clarity, many other elements found in typical radar systems, including MPAR systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments described herein utilize a sub-beamwidth model of weather radar clutter to achieve an increase in the effective resolution of a given radar array. This sub-beamwidth model is achieved using multiple simultaneous beams to generate highly overlapped coverage. A de-convolution procedure utilizing a matrix representative of the antenna pattern is used to process the multiple beam returns and extract the sub-beamwidth return data.

Referring generally to FIG. 1, the relationship between an exemplary radar beam and its corresponding resolution is described. Radar systems are often classified in terms of their "angular resolution". Angular resolution is the minimum angular separation required to resolve two distinct targets at a given range. A beam's half-power points (the −3 dB beam width) are normally specified as the limits of the antenna beam width for the purposes of defining angular resolution Thus, two identical targets at the same distance are resolved in angle if they are separated by more than the antenna −3 dB beam width.

A representative radar system 10 is provided in FIG. 1 to illustrate the above-described angular resolution characteristics of an exemplary radar system. The system 10 generally comprises an array of antenna elements 12 for transmitting a beam 14. At the beam's half-power points, a theoretical resolution cell 16 having a width 18 is illustrated. If more than a single target, or scatterer, resides within this resolution cell 16, the presence of each of these targets cannot be detected. Thus, multiple targets located within the resolution cell will appear as only a single target.

For explanatory purposes, we can assume the angular resolution of the system of FIG. 1 to be approximately three (3) degrees. This resolution is achievable using both conventional transmitting and receiving array elements, as well as using arrays suitably sized for multiple uses and applications. The resolution of the system of FIG. 1 may be sufficient in, for example, commercial aircraft tracking operations, wherein aircraft are sufficiently spaced so as to not occupy the same resolution cell, for example, cell 16. However, as described above, this angular resolution is insufficient for both standard MPAR requirements (one degree), as well as for operations which would benefit from an ability to produce super-resolution data.

In the case of weather radar, moisture, precipitation and other atmospheric characteristics provide countless scatters, or reflective surfaces within a given resolution cell. Accordingly, low angular resolution radar is significantly less-effective for determining certain atmospheric characteristics such as mesocyclone and tornado vortex signatures.

A proposed solution to the above-described technical and economic challenge is achieved by covering the reflected signal, or scatter, located within a main beam (such as beam 14) with a plurality of overlapping sub-beams. Using digital beamforming, a plurality of sub-beams may be generated, each of which has partial observations of the illuminated scattering. More specifically, in terms of a resolution cell, the system and method according to exemplary embodiments decomposes, or breaks up the single resolution cell, such as cell 16, into multiple cells using partially overlapping sub-beams so as to decrease the effective resolution cell size. This decrease in resolution cell size corresponds to an increase in the effective angular resolution.

Figure 2:
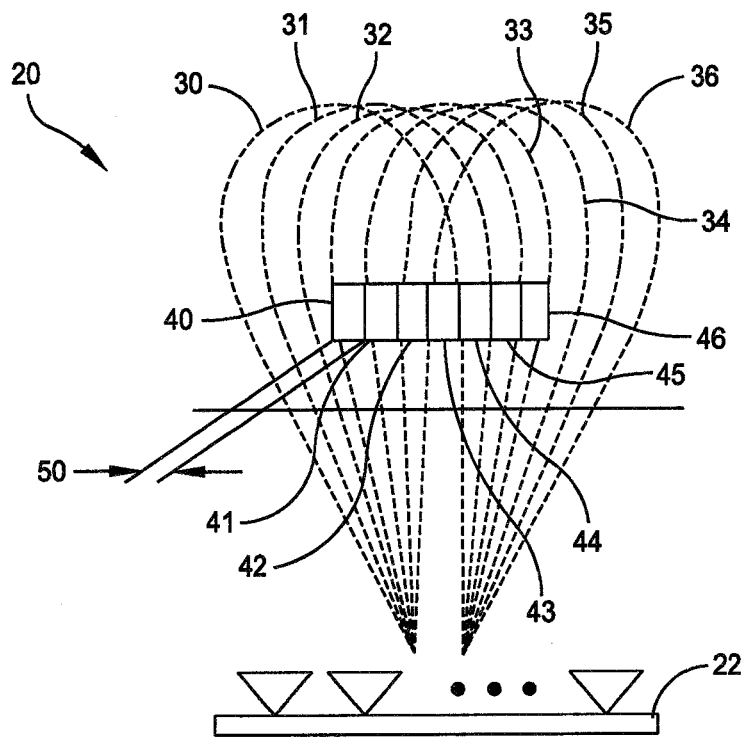
FIG. 2 is a graphic representation of an exemplary high (sub-beamwidth) resolution radar system according to embodiments of the present invention.

Referring generally to FIG. 2, a radar system 20 according to embodiments of the present invention is provided. For exemplary purposes, the system 20 may comprise the same antenna array 22 which provides the three-degree angular resolution and corresponding resolution cell 16 as described above with respect to FIG. 1. The antenna array 22 forms a center beam 33, identical to the beam 14 described in FIG. 1. However, in the illustrated embodiment, digital beamforming techniques are used to create a plurality of additional overlapping sub-beams 30-32 and 34-36. These beams 30-32 and 34-36 each partially overlap the center beam 33, and in aggregate, completely cover the center beam 33. As described above with respect to the background of the present invention, these sub-beams can be formed by transmitting, from a single radar array, phase shifted beams such that constructive and/or destructive interference between beams steer the beams into a desired overlapping pattern, such as that shown in FIG. 2.

In one embodiment of the present invention, the number of additional sub-beams used is determined by a desired (i.e. target) angular resolution. In the exemplary embodiment of FIG. 2, the scattering detected by the resolution cell of center beam 33 (see cell 16 in FIG. 1) is sub-divided into, for example, 2K+1 parts, with K being a super-resolution factor, in this instance 3. Accordingly, seven total beams are used to cover the effective scattering area of the representative center beam 14 (FIG. 1). Specifically, the reflectivity of the center beam 33 is covered by sub-divided, partially overlapping sub-beams 30-32 and 34-36 which cover the resolution cell of the center beam 33. The partial overlapping of these sub-beams forms respective sub-beam resolution cells 40-46 between adjacent sub-beams. Each sub-beam resolution cell may be of uniform dimensions and represents a fraction of the cell size of that of a resolution cell of the center beam 33. For example, a sub-beamwidth resolution cell 40 is effectively created between the non-overlapping portions of sub-beams 30 and 31. As is illustrated, the resolution cells are each one-seventh of the original resolution cell of the center beam 33 (16, FIG. 1).

Processing of the overlapping and non-overlapping returns of these sub-beams is achieved using a de-convolution process. Specifically, measuring the returns of the respective sub-beams 30-32 and 34-36, with the knowledge of the antenna pattern, can be used to retrieve the underlying effective scattering reflectivity of the sub-beam width resolution cells 40-46. Once received, overlapping beams are formed independently for each range-Doppler cell. The sub-beam width resolution data may be generated by applying a weighted matrix to the array input data (received radar return signals). The weighting matrix is derived from the pseudo-inverse of a matrix representative of the antenna pattern of the antenna array. Pseudo-inverse refers to the least squares solution of a linear system where the measurements (4K+1) is greater than the number of unknowns (2K+1). The weighting matrix W is known to be the pseudo-inverse of G as given in eq. (6) (below).

Depending on a desired angular resolution, a super-resolution factor K is chosen. From this factor, the system is operative to generate 2K+1 beams to cover the effective scattering reflectivity within the center beam 33. The reflectivity is comprised of a component generated from the antenna pattern itself, and a component of the reflectively off of the illuminated object, such that:

$$r_m = \sum_k g_m(u_k - u_m)s(u_k - u_m) \quad \text{eq. (1)}$$

with $$-2K \le m \le 2K \quad \text{eq. (2)}$$

and $$-K \le k \le K \quad \text{eq. (3)}$$

where $g_m$ is the two-way antenna pattern of the mth beam (with $g_0$ as the center beam), $u_m$ is the sine of the angle of the beam, and s(u) is the underlying reflectivity within the main beam.

The de-convolution process for determining the reflectivity r includes using a matrix G representative of the antenna pattern:

$$r = Gs \quad \text{eq. (4)}$$

$$\begin{bmatrix} r(-2K) \\ \vdots \\ \vdots \\ r(0) \\ \vdots \\ \vdots \\ r(2K) \end{bmatrix} = \begin{bmatrix} g_{-2K}(K) & 0 & 0 & 0 & 0 & 0 & 0 \\ & \ddots & \ddots & \ddots & & 0 & 0 \\ & \ldots & \ddots & \ddots & \ddots & & 0 \\ g_0(-K) & & \ddots & g_0(0) & \ddots & & g_0(K) \\ & & & \ddots & \ddots & \ddots & \ldots \\ 0 & 0 & & & \ddots & \ddots & \ldots \\ 0 & 0 & 0 & 0 & 0 & & g_{2K}(-K) \end{bmatrix} \begin{bmatrix} s(-K) \\ \vdots \\ s(0) \\ \vdots \\ s(K) \end{bmatrix} \quad \text{eq. (5)}$$

A least squares solution of the sub-beam reflectivity is given by:

$$\hat{s}(G^T G)^{-1} G^T r = Wr \quad \text{eq. (6)}$$

Figure 3:
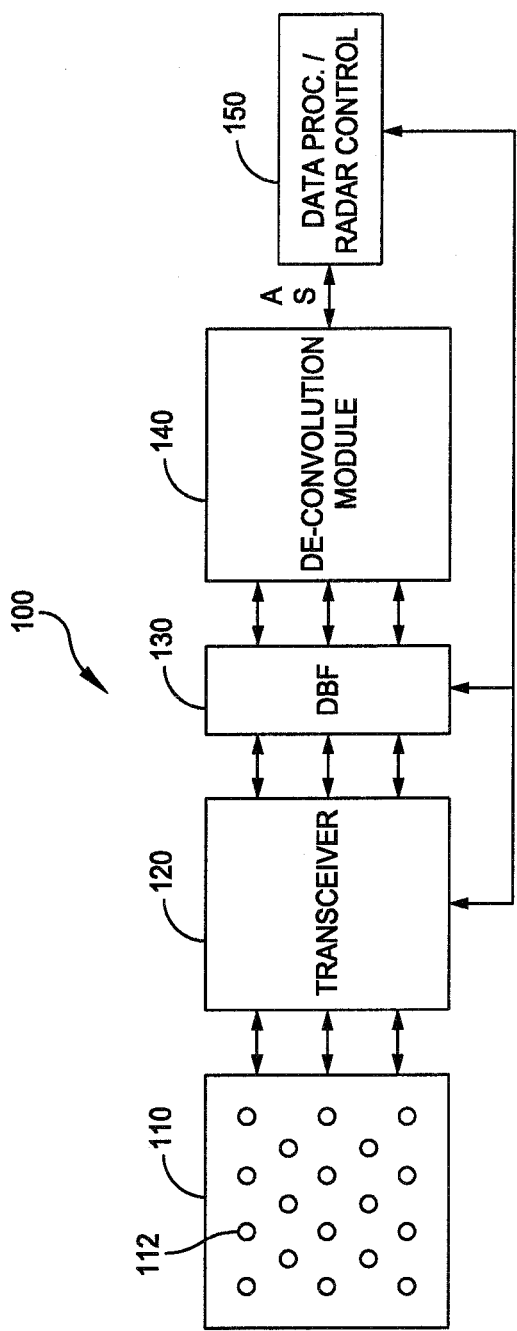
FIG. 3 is a block diagram of an exemplary high-resolution radar system according to an embodiment of the present invention.

Referring generally to FIG. 3, a block diagram of an exemplary, simplified radar system 100 for use in an embodiment of the present invention is provided. The system 100 comprises a radar transmitting and receiving array 110, such as a digital phased array common in MPAR systems. In a preferred embodiment, the antenna array 110 comprises a plurality of antenna radiating elements 112 configured in a common array aperture of m×n elements.

A data processor/radar control device 150 includes processor logic for generating array control commands for controlling the transmit and receive functions of the individual antenna elements 112. In a transmit mode, a representative control signal is supplied to at least one transceiver 120 operative to selectively control the antenna array 110 to form a desired beam pattern. As is known in the art, the transceiver 120 may include wave generator and exciter circuitry to achieve the desired control of the antenna elements. It should be understood that control device 150 may include processor logic for operating the radar system in multiple modes. For example, the control device 150 may selectively operate the system in the above-described increased resolution mode, or modes suitable for aircraft tracking, surveillance, or dual-polarization operation. These modes may require the formation and transmission of any number of beam patterns comprising a single beam or multiple beams.

In one embodiment, this beam pattern may consist of a central beam and a plurality of partially overlapping sub-beams which, in aggregate, cover the center beam, such as the beam pattern shown in FIG. 2. Specifically, each sub-beam partially overlaps at least one other sub-beam and at least partially overlaps the center beam. The number of desired sub-beams, and thus their orientation, will be pre-determined by the control device 150 according to a desired angular resolution. This quantity may be related to the intended operation of the radar system. For example, in weather-related operations, super-resolution data may be required. Thus, the effective resolution of the system may be enhanced by increasing the number of sub-beams. In the alternative, such as with air traffic control operations for example, such angular resolution may not be required, and a reduced number of sub-beams, or no sub-beams at all, may be generated.

Still referring to FIG. 3, reflected signal data is received via each of the antenna elements 112 and processed by the transceiver 120 and at least one digital beamformer 130. The beamformer 130 is operative to combine the received analog return signals to form one or more beams according to the antenna radiating pattern. Each beam is the result of a combination of the output signals of the antenna array 110 and are arranged according to the direction of the received signals, while signals arriving from other directions are de-emphasized.

Digital signals representing the various beams and sub-beams are applied to a de-convolution module 140. The de-convolution module 140 is operative to perform the above-described process of retrieving the underlying reflectivity within each sub-beamwidth resolution cell. This is accomplished by applying the weighted matrix indicative of the antenna pattern to the received, beamformed signals.

This output of high-resolution sub-beamwidth data is provided to the data processing/radar control module 150 for further processing. The output of the data processing module 150 may be fed to further processing, detecting, or tracking modules, or to a user display for visual target tracking and/or detection.

It should be noted that while only the de-convolution process is described, systems according to embodiments of the present invention may perform numerous other signal processing operations as is known in the art. For example, target signal detection, location processing, adaptive weight calculations, antenna nulling, Doppler filtering and other processing of the received signal waveforms may be included into an exemplary system without departing from the scope of the present invention.

Moreover, while only a simplified system diagram is provided, it is understood that embodiments of the present invention may be applied in systems having a wide variety of layouts with varying components without departing from the intended scope of the invention.

While the foregoing describes exemplary embodiments and implementations, it will be apparent to those skilled in the art that various modifications and variations can be made to the present invention without departing from the spirit and scope of the invention.

What is claimed is:
1. A phased array radar system comprising:
an antenna array;

a transceiver operatively connected to the array, the transceiver configured to simultaneously transmit a center beam and a plurality of at least partially overlapping sub-beams covering the center beam, and receive respective return signals from each of the sub-beams; and a processing module for processing received return signals from each of the sub-beams;

wherein the processing module is operative to generate resolution data corresponding to the overlapping portions of the transmitted sub-beams.

2. The system of claim 1, wherein the processing module performs a de-convolution operation, wherein the resolution data corresponding to the overlapping portions of the transmitted sub-beams is generated by applying a weighting matrix to the received return signals.

3. The system of claim 2, wherein the weighting matrix is derived from a matrix representative of the antenna pattern of the antenna array.

4. The system of claim 1, further comprising a control processor operatively connected to the transceiver, the control processor capable of operating the antenna array in multiple modes.

5. The system of claim 1, wherein the antenna array comprises a multi-function, phased array antenna.

6. The system of claim 1, wherein the center beam comprises a resolution cell, the resolution cell defining the minimum area in which two targets can be individually distinguished.

7. The system of claim 6, wherein the partial overlap of the sub-beams forms a plurality of sub-resolution cells within the resolution cell of the center beam.

8. A phased array radar system comprising:
an antenna array;
a transceiver operatively connected to the array, the transceiver configured to simultaneously transmit a center beam and a plurality of at least partially overlapping sub-beams covering the center beam, and receive respective return signals from each of the sub-beams; and a processing module for processing received return signals from each of the sub-beams;

wherein the center beam comprises a resolution cell, the resolution cell defining the minimum area in which two targets can be individually distinguished;

wherein the partial overlap of the sub-beams forms a plurality of sub-resolution cells within the resolution cell of the center beam; and wherein the processing module is operative to generate resolution data for each of the sub-resolution cells.

9. A method of operating a phased array radar system, the method comprising the steps:
transmitting a central beam and a plurality of overlapping sub-beams covering the central beam;
receiving return signals from the central beam and the overlapping sub-beams; and
generating, in at least one processor responsive to the received return signals, resolution data corresponding to the overlapping portions of the sub-beams.

10. The method of claim 9, wherein the step of generating resolution data includes applying a weighted matrix representative of the antenna pattern to the received return signals.

11. The method of claim 9, further comprising the step of forming a plurality of sub-resolution cells within a resolution cell defined by the central beam.

12. The method of claim 11, wherein the step of generating resolution data corresponding to the overlapping portions of the sub-beams comprises generating resolution data for each of the sub-resolution cells.

\* \* \* \* \*